Oct. 26, 1948.  E. L. MARTIN  2,452,251
RETRACTABLE LANDING GEAR FAIRING
Filed March 19, 1942  5 Sheets-Sheet 1
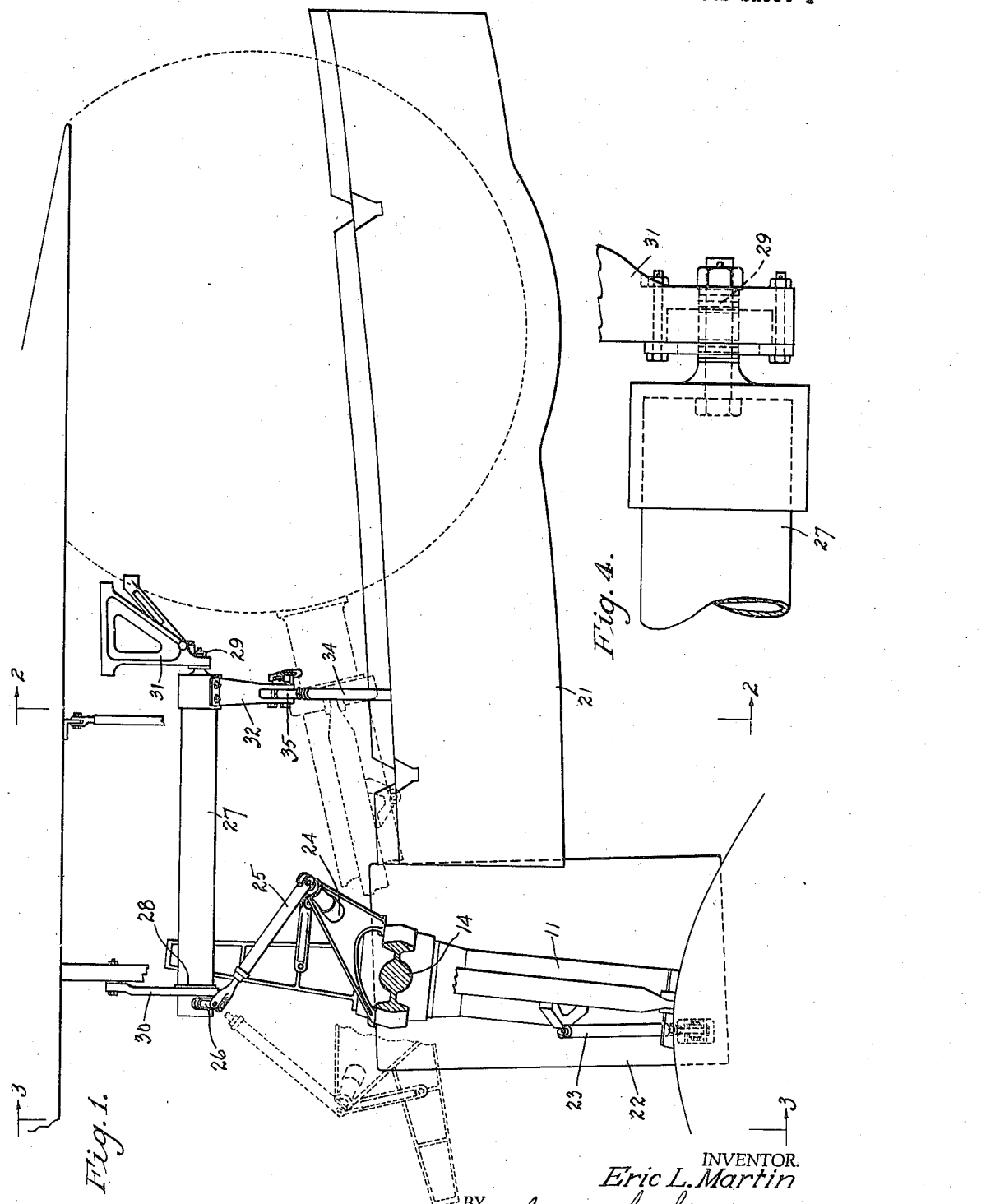
INVENTOR.
Eric L. Martin
BY Carlos G. Stratton
ATTORNEY

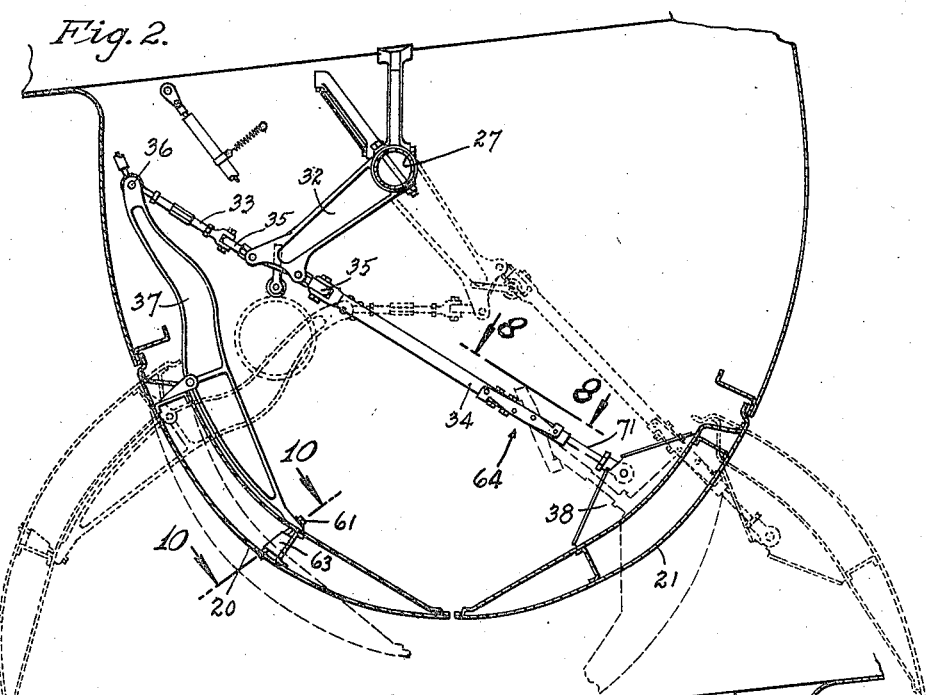

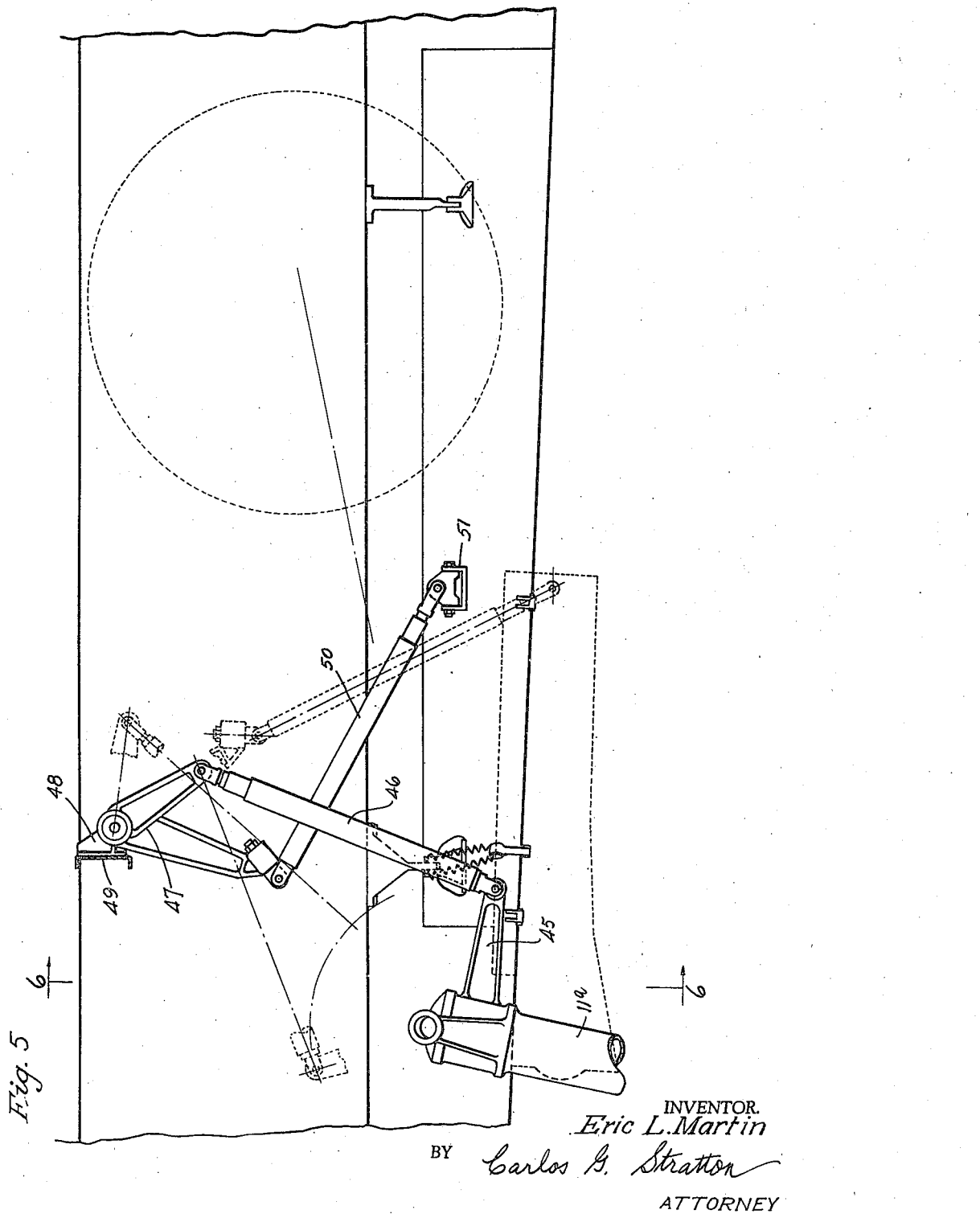

Oct. 26, 1948.  E. L. MARTIN  2,452,251
RETRACTABLE LANDING GEAR FAIRING
Filed March 19, 1942  5 Sheets-Sheet 4
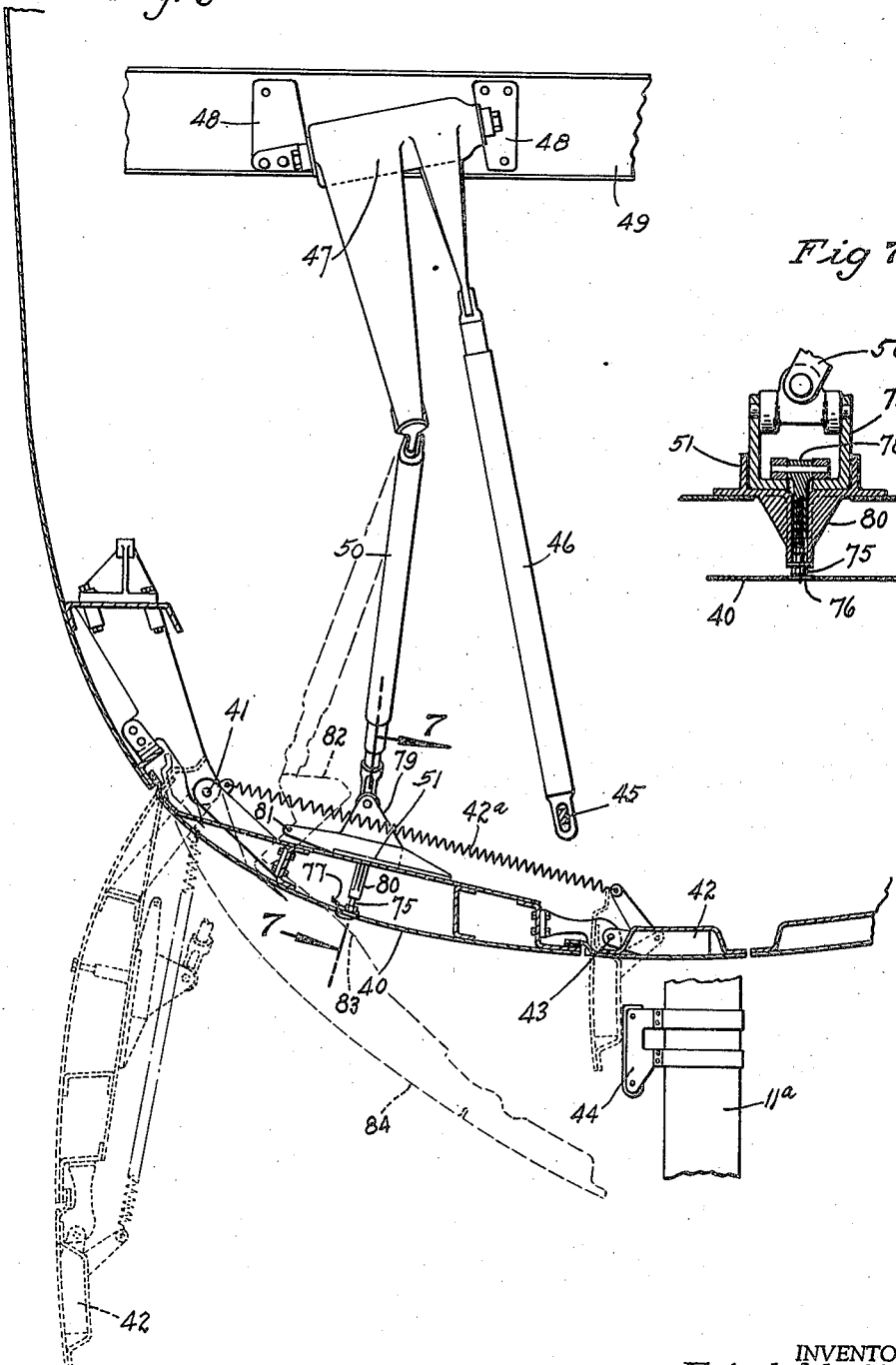
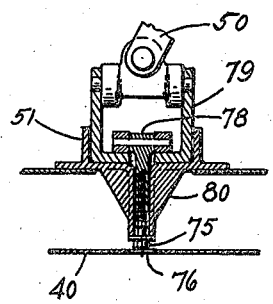
INVENTOR.
Eric L. Martin
BY Carlos G. Stratton
ATTORNEY

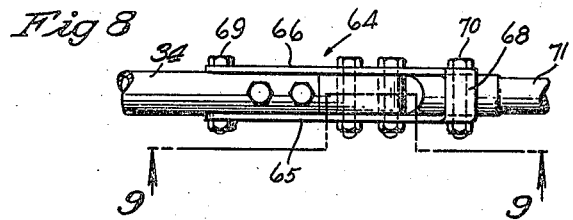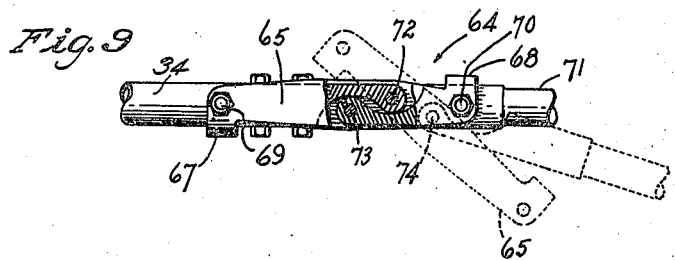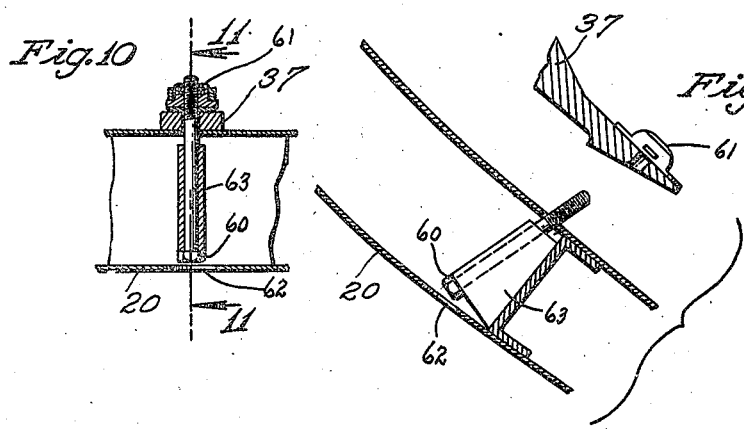

Patented Oct. 26, 1948

2,452,251

UNITED STATES PATENT OFFICE 2,452,251

RETRACTABLE LANDING GEAR FAIRING

Eric L. Martin, Santa Monica, Calif., assignor to North American Aviation, Inc., Inglewood, Calif., a corporation of Delaware Application March 19, 1942, Serial No. 435,253

20 Claims. (Cl. 244—102)

1

The present invention relates generally to retractable landing gear arrangements for aircraft, and more particularly landing gear capable of being extended below, and retracted into (a) a motor nacelle located in the aircraft wing (b) a wing, or (c) a fuselage.

The invention has for its primary object the provision of a fairing for the landing gear which will substantially close the landing gear well of the nacelle when the landing gear is extended, to thus aid in acceleration during take-off, by reducing drag, and will protect the landing gear well and mechanism therein from possible destruction, or disorganizing influence of brush, mud, and other ground substances by preventing the entrance of foreign material during landing and take-off operations.

I am aware that it has been known to provide a fairing for landing gear wells, partaking of the nature of a swinging door or doors, with opening arrangements, effective with the extension of the landing gear, and closing arrangements effective with the retraction of the landing gear. The invention proposes, and has for an object, going substantially beyond such arrangements and providing for the opening and closing of the fairing door or doors during both extension and retraction of the landing gear, whereby the fairing will not only reduce drag, during the take-off, but will be effective for the very important protection of the landing gear well and the mechanism therein when landing the aircraft, especially on a muddy or overgrown landing field.

It is also well known that landing gear swings about a single axis in raising and lowering, and in a plane normal to the plane of swinging movement of a fairing door or doors which, up to the present act as a closure in only the raised or retracted position of the landing gear. Notwithstanding this, the invention contemplates, and has for a further object, the provision of means and mechanism, actuated by the landing gear, in its extending and retracting movements for opening and closing the door or doors constituting the fairing, during each of said movements so that the fairing will be closed at the finish of each movement and consequently closed during take-off and landing, as well as during flight.

In further keeping with the foregoing statements and objects, and in consideration of the fact that substantially different means of operation must be adapted to single and double door fairing, examples of both operations will be made plain along mechanical lines thus far devised as best adapted to bring about the desired result, though it may well be that further developments will include other than mechanical means, for example, automatic hydraulic control and operating means.

In the accompanying drawings, which form a

2 part of this specification, and illustrate the invention without undue enlargement of the already well known operation of the landing gear, Figure 1 is a side view, with the landing gear shown in full lines in extended position and in dotted lines in retracted position, illustrating a double door fairing.

Figure 2 is a partial vertical transverse sectional view taken approximately on line 2—2 of Figure 1, the landing gear being retracted.

Figure 3 is a similar view, taken approximately on line 3—3 of Figure 1, showing the landing gear extended.

Fig. 4 is an enlarged detailed side view of one of the supporting bearings of the torque tube.

Figure 5 is a side view illustrating the application of the invention to a single door fairing, and Figure 6 is a partial transverse sectional view, taken approximately on line 6—6 of Figure 5.

Figure 7 is an enlarged cross section taken on the line 7—7 of Fig. 6.

Figure 8 is an enlarged plan view taken on the line 8—8 of Fig. 2.

Figure 9 is an elevation, partly broken away, on the line 9—9 of Fig. 8.

Figure 10 is an enlarged section taken on the line 10—10 of Fig. 2.

Figure 11 is a disassembled view taken on the line 11—11 of Fig. 10.

Referring to the drawings as a whole, it will be understood at the outset that in referring to the landing gear well what is intended is that portion of the lower part of the nacelle forming a ventral opening through which the landing gear is extended from, and retracted into, its nesting position within the contour or limits of the nacelle. It is this ventral opening with which the fairing of the present invention deals. The fairing is a double door arrangement as illustrated in Figures 1 to 3, inclusive, and a single door arrangement as illustrated in Figures 5 and 6.

In either arrangement, it is not the mere presence of a door or doors to close the ventral opening, with which the present invention is concerned, since it has been common practice to thus form a fairing or substantially complete the skin contour of the nacelle. It is, on the other hand, the control and manipulation of the fairing door or doors in such manner that they close, or substantially close the ventral opening not only when the landing gear is retracted and nested in the nacelle, but also when the landing gear is extended.

Since landing gear vary to a substantial extent in aircraft of different type, it is preferable to employ a double door fairing with certain types, whereas single door fairing is well adapted to other types. In either type, the present invention contemplates control of a door-like fairing in such manner that, in unison with the lowering and raising, or extension and retraction, of the landing gear, the fairing will in each instance both open and close, so that the ventral opening of the nacelle will be substantially covered when the landing gear is in use, as well as when retracted into its nesting position during flight.

It will also be understood that an oleo or landing gear swings through the ventral opening of a nacelle in a plane parallel to the longitudinal axis of the nacelle and thus in line with the movement of the aircraft as it lands and takes off, whereas the fairing swings laterally or in other words, at right angles to the swing of the landing gear. Since the landing gear, in retracted position, is nested wholly within the nacelle, or to be more particular, its landing gear well, there remains no obstruction to the full closing of the fairing in this position of the parts. When, however, the landing gear is lowered or extended, it is obvious that the oleo or wheel supporting strut and variously its brace or braces, do interfere with full closing of the fairing.

For the above reason, the fairing, as contemplated by the present invention, is proposed to be in the nature of a well door or doors, having provision for closing around the oleo strut in the extended position of the landing gear. In the case of a single door, this may take the form of a minor part or flap carried by the door itself and yieldable with respect thereto when it comes into abutting relation with the oleo strut. In the case of a double door, one of said doors may include an independently swinging minor part connected directly to the oleo strut of the landing gear for opening and closing thereby as the landing gear is extended and retracted. The minor door part, in this instance, remains open while the landing gear is in extended position, while the major part or main door closes in the manner before set forth.

With the foregoing in mind, and with particular reference to the double door arrangement shown in Figures 1 to 3 inclusive, the lower portion of the nacelle 10, along that part which houses the landing gear in retracted position, has a ventral opening through which the wheel supporting oleo strut 11 swings forwardly and downwardly in its movement to the extended position thereof as shown in full lines in Figure 1, wherein its retracted or nested position in the nacelle 10 is indicated in dotted lines.

The oleo strut 11 is shown with a laterally inclined brace 13 joined to its upper laterally extended cross head 14 having end bearings at 15 and 16 in the lower ends of bearing hangers 17 and 18. The strut is also shown with an upstanding extension 19 by which it is conected with an operating means causing its controlled movement to swing the strut in a vertical plane on the horizontal line of bearings 15 and 16 between its extended and retracted positions. The invention is not concerned with the means for controlled operation of the oleo strut 11, nor with the particular construction of the landing gear, except in so far as it affects other means controlling the fairing in the desired manner.

The fairing consists of a pair of similar oppositely laterally swinging doors 20 and 21, which are hinged along their outer sides to the nacelle 10 along the sides of its ventral opening, and are curved or contoured so that their full inner edges substantially meet in the raised, closed position, shown in Figure 2, to thus complete the belly contour of the nacelle. These are the main doors and their forward ends terminate short of the position occupied by the oleo strut 11 when the latter is extended as in Figure 3. In this latter position the said strut is within a forward extension of the ventral opening of the nacelle and this extension is closed only when the landing gear is retracted, as by a small single door 22 which may be connected by a single pivoted link bar 23 to the oleo strut brace 13 so that said single door will be opened and closed as the landing gear is extended and retracted.

For the controlled operation of the main doors 20 and 21 with which the invention is immediately concerned, Figures 1, 2 and 3 show a bracket 24 rigidly connected to, and projecting generally laterally and upwardly from the upper portion of the oleo strut 11, being securely fastened in any suitable maner to the inner portion of crosshead 14, or strut extension 19, or both. To the outer end of this bracket 24 is pivoted one end of an upwardly projecting link or connecting rod 25, similarly connected at its upper end to the short, rigid, laterally outstanding arm 26 of a torque tube 27.

The tube 27 is mounted longitudinally within the nacelle 10, to rotate on its axis by means of end bearings at 28 and 29, supported by hangers 30 and 31, it being noted, from Figure 1, that the arm 26 is located at the forward portion of the tube to cause axial rotation when the oleo strut 11 is raised and lowered, in such relation to bracket 24, that the latter passes forwardly and rearwardly, or rearwardly and forwardly, of the arm and is thus effective to oscillate the torque tube, or, in other words, rotate the same in opposite directions during extension of the landing gear as well as retraction thereof.

At or near the rear end of the torque tube 27, a somewhat longer rigid arm 32 inclines downwardly therefrom in a manner to swing laterally beneath the torque tube. To the outer end of this arm 32 the inner ends of connecting rods 33 and 34 are connected as by means of pivoted links 35, the pivoted connections of which to the said rods are at right angles to the pivoted connections thereof with the arm 32, as best seen in Figures 1 and 2.

The outer end of short connecting rod 33 is shown as pivotally connected at 36 to the upwardly and inwardly extending arm of a bracket 37, fixed at its center and lower outer portion to the door 20. The outer end of the longer connecting rod 34 is shown as extending, and pivotally connected to a bracket 38, fixed to the inner surface of door 21. Both connecting rods 33 and 34 are preferably in lengthwise adjustable sections so that the doors 20 and 21 may be brought to substantially fully closed position.

Since during extending, as well as retracting movement of the landing gear, the torque tube 27 is partially rotated first in one direction and then the other direction, the arm 32 will swing first from the full line position of Figure 2 to the dotted line position to cause the doors to swing open, and then again to the full line position to close the doors. These movements of the door are accomplished during swinging movement of the landing gear in precisely the same manner when the gear, or rather the oleo strut 11, is extended as they do when it is retracted. The result is that the doors are closed to cover the major portion, at least, of the ventral opening when landing and taking off, in substantially the same manner in which it has previously been covered after retraction of the landing gear in flight, with the important advantages hereinbefore stated.

According to this structural form of the invention, only the minor or smaller door 22, directly opposite to the oleo strut 11, remains open during the time the landing gear is extended. However, this small door leaves but a small opening immediately around the oleo strut 11, as will be plainly seen by a comparison of Figures 1 and 3.

The above described result and its advantages may be readily achieved in a single door fairing as outlined in Figures 5 and 6, wherein the door 40 hinged to swing along its upper or outer edge portion, as at 41, is shown with a pivoted flap section 42 at its forward inner portion. As best seen in Figure 6, the flap 42 is normally held in the door plane by a spring 42a, but its hinge at 43, with the door, permits the flap to yieldingly swing to a vertical position, when the oleo strut 11a is lowered or extended, by reason of contact of the flap, as the door closes, with an abutment or stationary cam 44 on the strut, see the full and dotted line positions of the door flap as in Figure 6.

In Figure 5, the olea strut 11a is shown with a rearwardly projecting bracket 45, pivotally connected to the lower end of an upstanding connecting rod 46. The upper end of this rod is pivotally connected to one depending arm of a bell-crank 47 which is suitably mounted in bearing supports 48 on a cross member 49. The other depending arm of this bell-crank 47 is pivotally connected to the upper end of a downwardly and rearwardly extending connecting rod 50, and the lower rear end of this connecting rod 50 is pivotally connected with a bracket 51 fixed to the door 40.

As the oleo strut 11a swings vertically in the extension and retraction of the landing gear, its door actuating bracket 45, as best seen in Figure 5, swings between the full and dotted line position, and in so doing it first rocks bell-crank 47 in a direction to create downward thrust of the connecting rod 50 for causing downwardly swinging, opening movement of the door 40, and then rocks bell-crank 47 in the opposite direction to create upward pull on connecting rod 50 for causing upwardly swinging, closing movement of the door. Thus, irrespective of the starting point of the movements, or in other words, irrespective of whether the landing gear is being extended or retracted, both movements will take place as described and the doors will be first opened and then closed, to remain closed while the landing gear is both extended and retracted.

Simple, yet practical, means are provided for opening the doors 20 and 21 when the landing gear is extended. Under normal conditions said doors are closed when the landing gear is fully extended, but when it is desired to open said doors, as when the aircraft is resting on its landing gear, a bolt 60 is unscrewed from its holding nut 61, which is preferably the basket type, which is well known to those skilled in the art. It is believed clear without further illustration that the bolt 60 may be fastened against turning in its nut by any suitable means. An aperture 62 in the skin 20 affords access to the head of the bolt 60. A bracket 63 supports the bolt, while the bracket arm 37 supports the nut 61.

After the door 20 is opened by unscrewing the bolt 60, the door 21 may be opened by breaking the linkage 64, which comprises integral side plates 65 and 66 and cross members 67 and 68.

During ordinary operation, the linkage is fastened in the position shown in Fig. 8 and in full lines in Fig. 9. Bolts 69 and 70 fasten the linkage in said ordinary working position, in which position the bolts 69 and 70 pass through both side plates 65 and 66 and through alined portions of rod 34 and 71.

The rod portions 34 and 71 respectively have pivots 72 and 73 at the overlapping ends thereof as best shown in Fig. 9. The side plates 65 and 66 are mounted to swing on the pivots 72 and 73, so that the pivot 73 may swing from its full line position in Fig. 9 to its broken line position 74 when the side plates are moved from their full line to their broken line positions in Fig. 9. This movement elongates the rod 34, permitting a partial opening of the door 21.

Means are also provided to open the door 40, consisting of a bolt 75 exposed through an opening 76 in the skin of the aircraft. A wire 77 is normally passed through an aperture in the head of the bolt 75 and through an aperture in the skin, to prevent the bolt from turning in its nut 78.

The nut 78 is pivoted on a foot 79 of the rod 50. The nut projects through a guide 80 on the door 40. When the bolt 75 is screwed home in the nut 78, the foot 79 is firmly held in the fixed bracket 51, as shown in Fig. 7 and in full lines in Fig. 6. When the bolt 75 is unscrewed from the nut 78, the normally fixed bracket 51 is free to swing on the foot 79 around a pivot 81, connecting the bracket and the said foot. The door 40 is thereby able to open. The broken line positions of the foot, as shown at 82, the bracket, as shown at 83, and the door, as shown at 84, illustrate their respective positions when the bolt 75 has been removed and the door 40 thereby opened.

While I have illustrated and described what I now regard as the preferred embodiment of my invention, the construction is, of course, subject to modifications without departing from the spirit and scope of my invention. I, therefore, do not wish to restrict myself to the particular form of construction illustrated and described, but desire to avail myself of all modifications that may fall within the scope of the appended claims.

Having thus described my invention, what I claim and desire to secure by Letters Patent is:

1. An aircraft including a retractable landing gear, a fairing therefor including a door or doors, and means connecting said gear and door or doors and actuated by said landing gear and both opening and closing said door or doors during each effective retracting movement and each effective extending movement of the landing gear, said door or doors having a yieldable section for contact with the landing gear in its extended position.

2. A nacelle for aircraft having a ventral opening, a retractable landing gear shiftable through said opening between extended and retracted positions, a fairing therefor including a door swingably attached to the nacelle, and a leverage connection between said landing gear and said door effective to swing the door to open and closed positions in a continuous movement during each extending and retractile movement of the landing gear.

3. A nacelle for aircraft having a ventral opening, a retractable landing gear shiftable through said opening between extended and retracted positions, a fairing therefor including a door swingably attached to the nacelle, and means connecting the door and landing gear and actuated by the landing gear for swinging said door to open and closed positions in a continuous movement during each extending and each retractile movement of the landing gear, the door having a flap in hinged, spring-controlled connection with its free edge and yieldingly engageable with the landing gear when the latter is in landing position.

4. A nacelle for aircraft having a ventral opening, a retractable landing gear shiftable through said opening between extended and retracted positions, a fairing therefor including a pair of main swinging doors and a smaller supplemental door, all hinged to the nacelle, connections between the landing gear and the supplemental door, opening the latter as the landing gear is shifted from retracted position to extended position, and other connections between the landing gear and the main doors opening and closing said main doors in a continuous movement during each extending and retracting movement of the landing gear.

5. A nacelle for aircraft having a ventral opening, a retractable landing gear swingable through said opening in its movements between extended and retracted positions, a fairing therefor including a door swingably attached to the nacelle, a door opening and closing member within the nacelle and operatively connected to the door, and connections between the landing gear and said door opening and closing member, effective to shift the latter successively in door opening and closing directions and in a continuous movement during each extending and each retractile movement of the landing gear.

6. In combination, a portion of an aircraft having an opening for landing gear, landing gear swingable into and out of said aircraft portion through said opening, doors for said opening, mechanism connecting said landing gear and door and actuated by the landing gear to swing to a closed position at least one of the doors when the landing gear is in an extended position, closing at least a portion of the space through which the landing gear swings, the landing gear being disposed in the path of another door whereby the latter door is open whenever the landing gear is extended, and means to release said mechanism including a device accessible from the exterior of the aircraft.

7. In combination, a portion of an aircraft having an opening for landing gear, landing gear swingable into and out of said aircraft portion through said opening, doors for said opening, mechanism connected to swing at least two of the doors to a closed position when the landing gear is in an extended position, closing at least a portion of the space through which the landing gear swings, the landing gear being disposed in the path of another door whereby the latter door is open whenever the landing gear is extended, means to release one of the doors controlled by said mechanism including a device accessible from the exterior of the aircraft, and break link mechanism connected to release the other door from the interior of the aircraft.

8. Aircraft including a nacelle adapted to house a landing gear and having a ventral opening, a landing gear extendable and retractable through said opening, a fairing door hinged to said nacelle and adapted to be closed in both the extended and retracted positions of said landing gear, and motion transmitting means connecting said gear and said door and adapted to transmit motion from said gear to said door during both extending and retracting movements of the gear and to first open and then close the door during each of said gear movements.

9. Aircraft including a nacelle adapted to house a landing gear, said nacelle having a ventral opening, a retractable landing gear extendable and retractable through said opening, said nacelle including openable fairings adapted to be closed in both the extended and retracted positions of said landing gear, and positive motion transmitting means operatively connecting said landing gear and fairing to positively transmit motion from said gear to said fairing during both extending and retracting movements of the gear and to first open and then close the fairing during each of said gear movements.

10. Landing gear as defined in claim 9, wherein the fairing is in the form of a door, hinged to the nacelle, and having at its swinging side a hinged spring-urged flap yieldingly engageable with the landing gear when the latter is in extended position.

11. An aircraft including a retractable landing gear and having a ventral opening through which said gear is movable to extended and retracted positions, a fairing means for substantially covering said opening when the landing gear is in either extended or retracted position, and means operatively connecting said gear and said fairing means and responsive to movement of said landing gear for both opening and closing said fairing means during each extending and each retractile movement of said gear.

12. An aircraft including a retractable landing gear, said aircraft having a ventral opening and a fairing therefor adapted to cover said opening when said gear is either extended or retracted, means for operating said fairing, and means operatively connecting said landing gear and said fairing for opening and closing the fairing in a continuous positive movement during each extending and each retractile movement of the landing gear.

13. An aircraft having a landing gear housing containing a ventral opening, a landing gear movable through said opening to extended and retracted positions, a fairing for said opening comprising a door adapted to substantially cover said opening in either the extended or retracted position of the landing gear, and means operatively connecting said landing gear and said door and responsive to movement of said landing gear for opening and closing said door in a continuous positive movement during each extending and each retracting movement of said landing gear.

14. An aircraft having a landing gear housing provided with a ventral opening, a landing gear shiftable through said opening to extended and retracted positions, a fairing for said opening, and means operatively connecting said landing gear and said fairing and responsive to movement of the landing gear to open and close said fairing in a single continuous positive movement during each shifting of the gear to extended and retracted positions.

15. A nacelle for aircraft, a retractable landing gear shiftable from a position within the nacelle through an opening therein to an extended position outside the nacelle, a fairing associated with the nacelle and adapted to close said opening in either the extended or retracted position of the landing gear, operating means for said fairing, and means operatively connecting said landing gear to said operating means whereby extension and retraction of said landing gear successively opens and closes said fairing in a continuous positive operation during each movement of the landing gear to and from extended positions.

16. An aircraft including a retractable landing gear, said aircraft being provided with an opening through which said landing gear is movable to and from extended position, a fairing for said opening, and means connecting said fairing and landing gear and actuable by the latter for both opening and closing said fairing during each movement of said landing gear to and from extended position.

17. An aircraft provided with an opening, a landing gear extendible and retractable through said opening, a fairing for said opening, operating means for moving said fairing to open and closed positions, and means operatively connecting said landing gear and said operating means and responsive to movement of said landing gear for moving said fairing from and to a closed position during each extending and retracting movement of the landing gear.

18. An aircraft having a landing gear housing provided with a ventral opening, a landing gear shiftable through said opening to extended and retracted positions, a fairing for said opening, and means operatively connecting said landing gear and said fairing and responsive to movement of the landing gear to open and close said fairing in a continuous positive movement during each shifting of the gear to extended and retracted positions.

19. An aircraft having a landing gear housing provided with a ventral opening, a retractable landing gear swingable through said opening in its movements between extended and retracted positions, a door for said opening swingably attached to said aircraft, door opening and closing means, and connections between the landing gear and said door opening and closing means, effective to shift the latter successively in door opening and closing directions and in a continuous movement during each extending and each retractile movement of the landing gear.

20. Aircraft including retractable landing gear, means for enclosing said landing gear including openable fairing, and motion transmitting means connecting said landing gear and said fairing and adapted to transmit motion from said gear to said door during both extending and retracting movements of the gear and to first open and then close the door during each of said gear movements, said fairing including a yieldable section for contact with the gear in the extended position of the latter.

ERIC L. MARTIN.

REFERENCES CITED

The following references are of record in the file of this patent:

UNITED STATES PATENTS

| Number | Name | Date |
|---|---|---|
| 1,812,451 | Schapel | June 30, 1931 |
| 1,890,902 | Douglas | Dec. 13, 1932 |
| 2,001,620 | Levy | May 14, 1935 |
| 2,025,743 | Hathorn | Dec. 31, 1935 |
| 2,180,462 | De Seversky | Nov. 21, 1939 |
| 2,362,919 | Miller | Nov. 14, 1944 |